United States Patent [19]
Marley

[11] 4,284,846
[45] * Aug. 18, 1981

[54] SYSTEM AND METHOD FOR SOUND RECOGNITION

[76] Inventor: John Marley, 8715 E. Mackenzie Dr., Scottsdale, Ariz. 85251

[*] Notice: The portion of the term of this patent subsequent to Jan. 1, 1997, has been disclaimed.

[21] Appl. No.: 62,759

[22] Filed: Aug. 1, 1979

Related U.S. Application Data

[63] Continuation-in-part of Ser. No. 903,697, May 8, 1978, Pat. No. 4,181,813.

[51] Int. Cl.³ .............................................. G10L 1/00
[52] U.S. Cl. ............................... 179/1 SE; 179/1 SD
[58] Field of Search ................ 179/1 SE, 1 SB, 1 SC, 179/1 SD, 1 VC; 324/76 R; 340/148, 146.3 AQ

[56] References Cited
U.S. PATENT DOCUMENTS

| | | | |
|---|---|---|---|
| 3,416,080 | 12/1968 | Wright et al. | 179/1 SD |
| 4,181,813 | 1/1980 | Marley | 179/1 SE |

OTHER PUBLICATIONS

J. Flanagan, "Computers That Talk and Listen," Proc. IEEE, Apr. 1976, pp. 405-415.

*Primary Examiner*—Mark E. Nusbaum
*Assistant Examiner*—E. S. Kemeny
*Attorney, Agent, or Firm*—Cahill, Sutton and Thomas

[57] ABSTRACT

Sounds produced by human or mechanical sources are recognized by comparison of certain waveform characteristic ratios with prestored ratios. Transitions and transition glides of characteristics are used to select certain stored groups of ratios for comparing.

10 Claims, 11 Drawing Figures

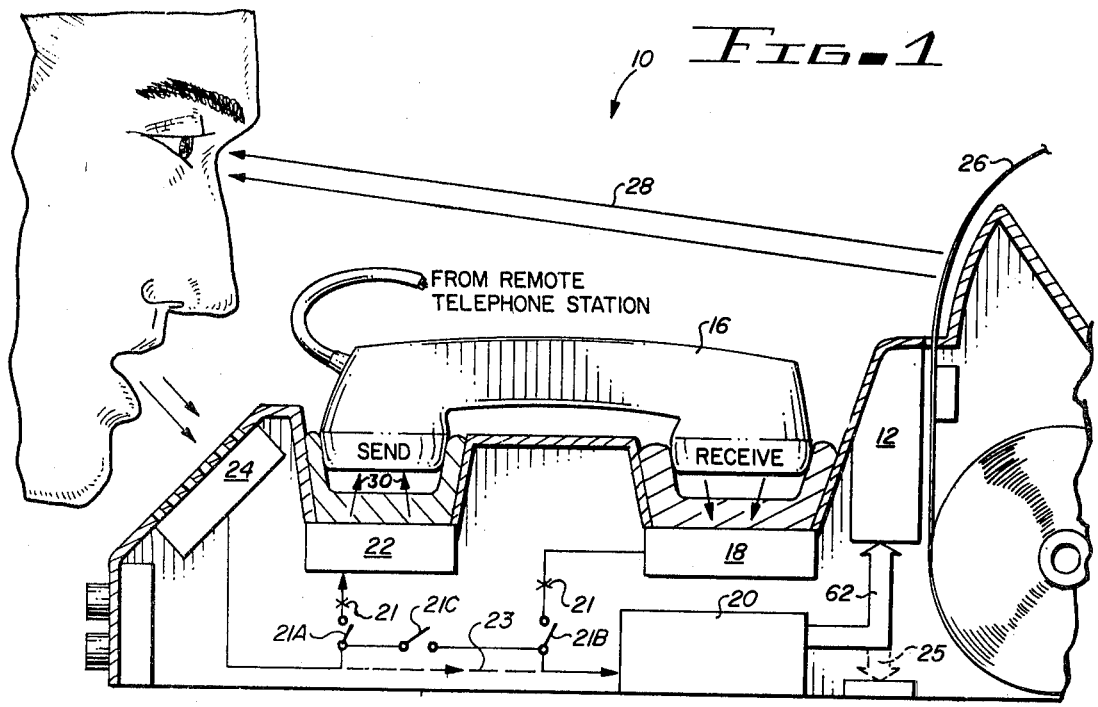

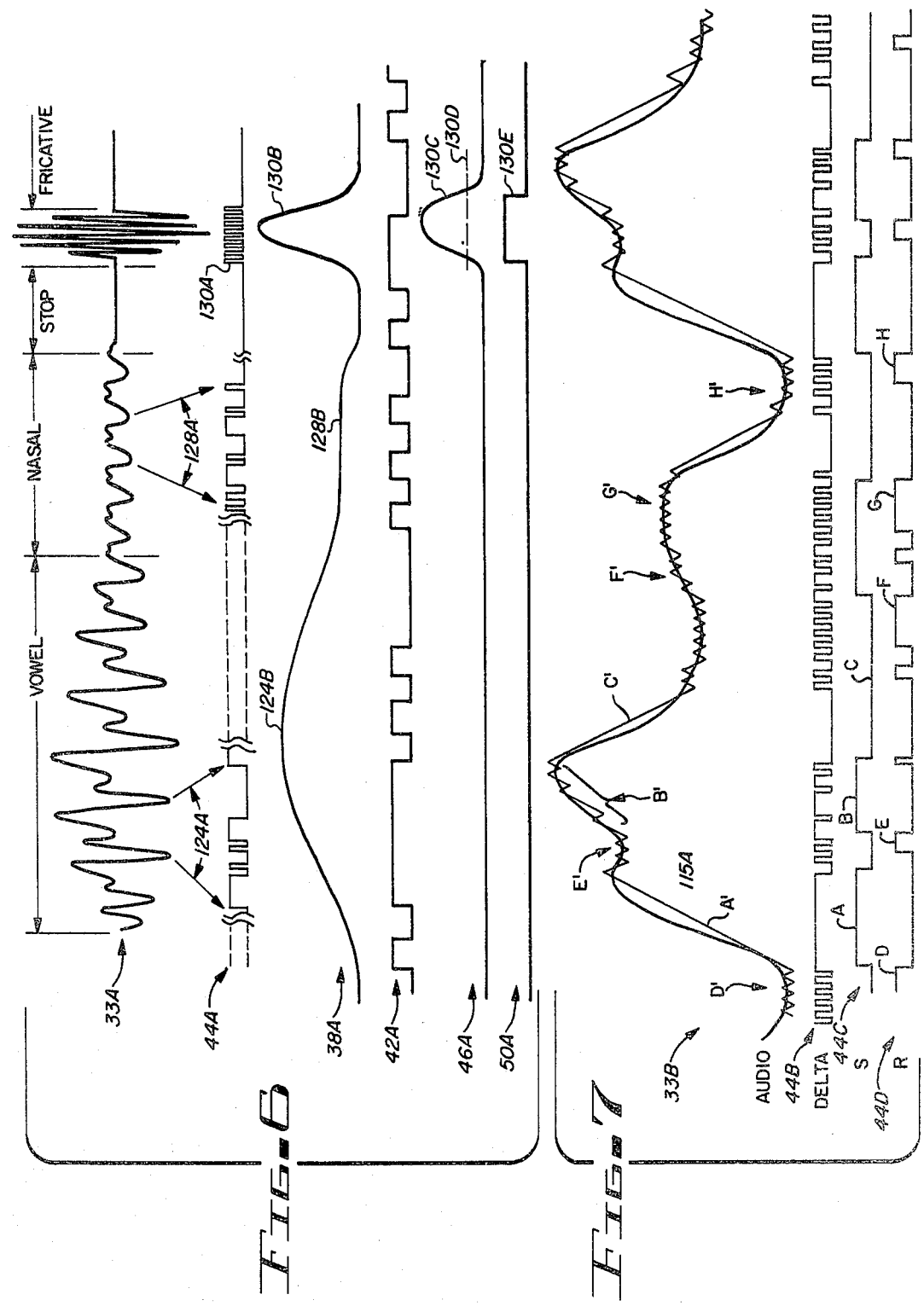

SYSTEM AND METHOD FOR SOUND RECOGNITION

RELATED APPLICATIONS

This application is a continuation-in-part of my co-pending patent application "SYSTEM AND METHOD FOR SPEECH RECOGNITION", Ser. No. 903,697, filed May 8, 1978, which issued as U.S. Pat. No. 4,181,813 on Jan. 1, 1980.

BACKGROUND OF THE INVENTION

1. Field of the Invention

The invention relates to systems and methods for speech recognition, and more particularly to systems for recognition of specific sound corresponding to phonemes and transitions therebetween in ordinary spoken speech.

2. Description of the Prior Art

In recent years there has been a great deal of research in the area of voice recognition and speech recognition because there are numerous potential applications for a reliable, low cost voice recognition system or speech recognition system. A few types of voice recognition units are presently commercially available, costing in the range from $10,000 to $100,000 and having capability of recognizing a limited number of isolated spoken words. A few systems have the capability of recognizing small groups of words spoken without pauses between words, as mentioned in the article "Voice-Recognition Unit For Data Processing Can Handle 120 Words," Electronics, Page 69, Apr. 13, 1978.

The present state of the art in this area is reviewed in "Speech Recognition by Machine: A Review," by D. Raj Reddy, Proceedings of the IEEE, Apr. 1, 1976, Pages 501–531. More detailed information in particularly relevant areas of the speech recognition area are described in the following articles: "*Algorithm for Pitch Extraction Using Zero-Crossing Interval Sequence*" by Nezih C. Geckinli and Davras Yavuz, IEEE Transactions on Acoustic Speech and Signal Processing, Volume ASSP-25, Number 6, December, 1977; "*Continuous Speech Recognition by Statistical Methods*" by Frederick Jelinek, Proceedings of the IEEE, Volume 64, Number 4, April, 1976; "*Pseudo-Maximum-Likelihood Speech Extraction,*" by David H. Friedman, IEEE Transactions on Acoustics, Speech, and Signal Processing, Volume ASSP-25, Number 3, June, 1977; "*Practical Applications of Voice Input to Machines,*" by Thomas B. Martin, Proceedings of the IEEE, Volume 64, Number 4, April 1976; "*On the Use of Autocorrelation Analysis for Pitch Detection,*" by Lawrence R. Rabiner, IEEE Transactions on Acoustics, Speech, and Signal Processing, Volume ASSP-25, Number 1, February, 1977; and "*Communication Aids for People with Impaired Speech and Hearing,*" by A. F. Newell, Electronics and Power, October 1977.

The complexity of prior systems and methods for speech recognition have been extremely complex and expensive because of the complexity of the processes of understanding human speech. Workers in the art have utilized various sources of knowledge that all people subsconsciously use, including knowledge of a particular language, a particular environment, and the context of a particular communication in order to understand a sentence. These sources of knowledge include characteristics of speech sounds (phonetics), variability in pronunciations (phonology) the stress and intonation patterns of speech (prosodics), the sound patterns of words (lexicon), the grammatical structure of language (syntax), the meaning of words and sentences (semantics), and the context of conversation (pragmatics). Although the "programmed" computer-like mind of a mature human being is capable of processing all of these various sources of knowledge in order to recognize speech, the present state of the art requires tremendously expensive computer hardware, including large amounts of memory and software to store the data and algorithms necessary to achieve even limited understanding of isolated words and short groups of "connected" words.

The main problems involved in speech recognition include normalization of speech signals to compensate for amplitude and pitch variations in human speech, obtaining reliable and efficient parametric representation of speech signals for processing by digital computers, ensuring that the system can adapt to different speakers and/or new vocabularies, and determining the similarity of computed parameters of received speech with stored speech parameters. Known systems involve digitizing and analyzing incoming speech signals to obtain parametric representation thereof. Various complex schemes have been devised for detecting the beginnings and ends of various sounds, words, etc. Techniques for normalizing with respect to amplitude and frequency to obtain a normalized pattern are known. In most known speech recognition systems, reference patterns are "learned," stored in computing systems, and compared to the normalized unknown signal patterns. When a matching is found between such unknown and stored signal patterns, output signals are produced, which signals cause printing, display or other electromechanical action representing the incoming speech.

The most common method of digitizing speech has been by means of pulse code modulation techniques, which divide an analog signal into a predetermined number of "segments." Previous systems typically filter the speech input into a relatively large number of channels to isolate the various frequency components, each of which is pulse code modulated. Each increment of each channel waveform requires a digital word to be stored, so large amounts of temporary memory storage and digital processing have been required. Specialized algorithms have been developed to recognize "formants" (which are spectral regions of high intensity sound) from the digital data obtained from the various frequency channels. These algorithms have been developed to recognize consonants, vowels, liquid consonants, and sharp transient sounds represented by such data. Statistical techniques have also been utilized to analyze the data obtained from the spectral filtering and pulse code modulation of the incoming speech signals.

The previous speech recognition systems and methods involve limited vocabularies, since the amount of computer hardware and software involved for recognition of large numbers of words and connections of words is prohibitive. This limitation requires substantially differently programmed machines for different applications, since the most commonly used words vary widely among different trades and professions.

In short, there is a great presently un-met need for a reliable, flexible, and low-cost system and method for speech recognition.

SUMMARY OF THE INVENTION

Accordingly, it is an object of the invention to provide a low-cost, reliable, easily utilizable speech recognition system and method for producing acceptably interpretable signals representing phonemes and groups of phonemes for a variety of applications.

It is another object of the invention to provide a system and method for speech recognition unrestricted by a limited stored vocabulary.

It is another object of the invention to provide a system and method for speech recognition which is unlimited by the syntax and semantics of groups of words.

It is another object of the invention to provide a system and method for speech recognition which is not limited to any time duration of continuous speech.

It is another object of the invention to provide a speech recognition system and method without requiring that speech signals be filtered into a large number of tuned channels each incorporating mutually exclusive portions of the speech frequency spectrum.

It is another object of the invention to provide a low cost speech recognition system and method which is substantially independent of the pitch of speech signals received thereby.

It is another object of the invention to provide a speech recognition system and method requiring substantially less computing apparatus, memory, and software than known speech recognition systems.

It is yet another object of the invention to provide a low cost speech recognition system and method for converting speech signals into acceptably readable displayed or printed material.

It is another object of the invention to provide a speech recognition system and method which avoids the necessity of reprogramming or "learning" by the speech recognition system in order to accurately recognize speech by different persons having different voice characteristics.

It is another object of the invention to provide a speech recognition system and method which does not require storage of a predetermined number of vocabulary words.

It is another object of the invention to provide a speech method and system which requires substantially fewer operations to correlate incoming speech to stored phoneme information than is required by known speech correlation systems.

It is another object of the invention to provide a speech recognition system and method having substantially lower complexity and cost than known speech recognition systems, and yet is capable of producing acceptably readable printed phoneme representations of speech or acceptably interpretable phoneme signals representative of spoken speech.

It is another object of the invention to provide a simple low-cost method for electrically characterizing significant phonetic and transitional features of a variety of speech signals to aid matching of received speech signals to stored phoneme parameters to produce an acceptably interpretable group of phoneme signals or acceptably readable phoneme print out material.

It is yet another object of the invention to provide a low cost, reliable, easily useable speech recognition system to enable deaf or hard-of-hearing persons to utilize a public telephone system.

It is yet another object of the invention to provide a low-cost, reliable voice-to-print dictating maching which produces acceptably readable phoneme groups representing dictated speech.

It is another object of the invention to provide a low cost speech therapy apparatus.

It is another object of the invention to provide a low cost, reliable speech recognition system for providing digital signals to control various digitally controlled electromechanical machines in response to speech.

Another object of the invention is to provide a low cost system for producing control signals to control machines in response to particular distinctive mechanically produced sounds or other sounds which are not produced by a human mouth.

Briefly described, and in accordance with one embodiment thereof, the invention provides a system and method for producing phoneme-representing signals in response to speech signals. The system includes circuitry for delta modulating the speech signals to digitize such speech signals, circuitry operating upon the digitized speech signals to determine major slope transitions of the speech signals, circuitry for computing speech waveform characteristic ratios of time intervals between certain ones of the major slope transitions, and circuitry for comparing the speech waveform characteristic ratios with stored phoneme ratios or parameters to determine if the computed speech waveform characteristic ratios match any of the stored phoneme ratios, and, finally, producing the phoneme-representing signals in response to such matching. The phoneme-representing signals are utilized to control a phoneme printer which prints out phoneme symbols corresponding to respective ones of the phoneme-representing signals. In one embodiment of the invention, the speech signals are inputted to a negative feedback amplifier for normalizing the speech signals, the normalized amplifier output being inputted to the delta modulating circuit.

The delta modulating circuit operates in accordance with a predetermined sampling rate selected in the range from approximately thirty to seventy kilohertz. A negative feedback signal of the amplifier is also delta modulated at a substantially lower sampling rate in the range from one hundred to three hundred hertz to digitize an amplitude envelope of the speech signals. The speech signals are inputted to circuitry which filters out a predetermined "high end" or "hissing" range of frequency components of the speech signals and produces digital pulses representing components of the filtered frequency components having magnitudes exceeding a predetermined threshold. The comparing circuitry utilizes the digitized magnitude information and high frequency component indicating pulses to systemmatically compare the speech waveform characteristic ratios with the stored phoneme ratios. In one embodiment of the invention, the comparing circuitry includes a processor and associated memory (containing the stored phoneme ratios) to execute a comparing algorithm controlling the order of said comparing. The comparing algorithm addresses certain phoneme-ratio-containing locations of the memory in accordance with predetermined groupings of linguistically related sets of phonemes. Each of the sets is arranged in order of the average frequency of occurrence of the phonemes in a spoken language. In one embodiment of the invention, the delta modulator circuitry includes an internal ramp circuit producing a ramp signal having a slope variable in accordance with variations in the amplitude of the normalized analog signal received from the negative feedback amplifier circuitry. In another embodiment of the invention, the algorithm causes the processor to operate on the digitized speech signal to detect major slope transitions of the speech signal by detecting information corresponding to presence and absence of successive slope reversals of the ramp circuit of the delta modulating circuitry. Major amplitude transitions and major "flat" portions of the speech signal are thereby identified. The phoneme printer, in one embodiment of the invention, further prints out symbols indicating the amplitude of the voice producing the sounds represented by the printed phoneme symbols. A portion of the algorithm controls the format of the phoneme symbol print out. The latter portion of the algorithm permits only one phoneme symbol corresponding to each phoneme sound recognized to be printed out, thereby improving the readability of words having sustained sounds. In another embodiment of the invention, the speech signals are produced by the earphone of a telephone headset, enabling a deaf or hard-of-hearing person to converse on a public telephone system by speaking into the microphone of the telephone headset and reading a real-time phoneme printout representing the conversation speech signals received from the party on the other end of the telephone circuit. In another embodiment of the invention, the method and system of the invention are incorporated in a dictating machine which prints out phoneme groups representing the dictated material. Another embodiment of the invention incorporates the inventive speech recognition system and method in a speech theraph device which converts speech into a real-time phoneme print out or display indications of improper pronunciation of certain sounds and improper intensity thereof.

Another embodiment of the invention incorporates the inventive speech recognition system and method to produce phoneme-representing signals as digital inputs to a digitally controlled machine.

Another embodiment of the invention includes incorporation of the above sound recognition system into a system for interpreting mechanically produced sounds or sounds produced otherwise than by human mouths and produces signals which are utilized as control signals responsive to certain characteristic ones of such sounds.

BRIEF DESCRIPTION OF THE DRAWINGS

FIG. 1 is a pictorial diagram generally illustrating one embodiment of the invention.

FIG. 2 is a table illustrating a proposed phoneme set for the system of FIG. 1.

FIG. 6 shows a number of waveforms useful in describing the operation of the system of FIG. 3.

FIG. 7 shows a number of waveforms useful in describing the operation of the speech recognition system of FIG. 3.

DESCRIPTION OF THE INVENTION

Figure 3:
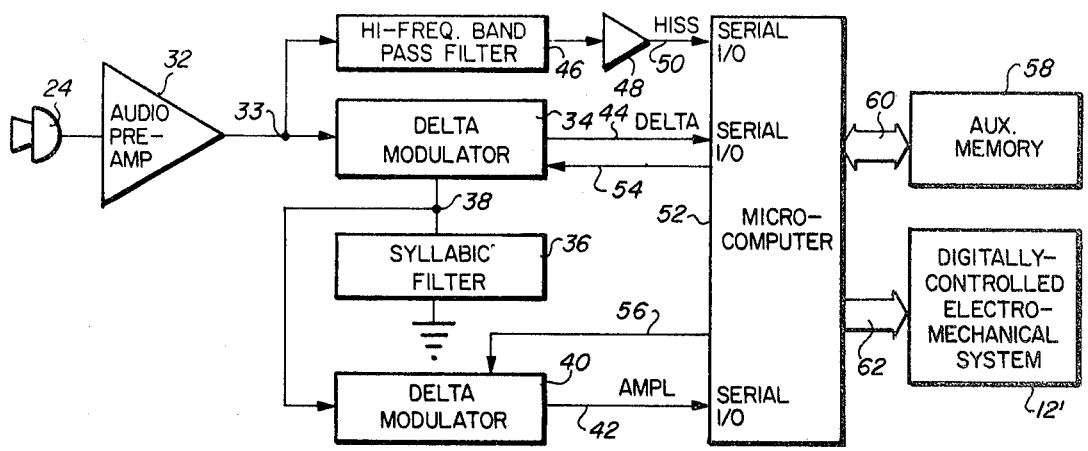
FIG. 3 is a block diagram of the system components of the speech recognition system of FIG. 1.

The invention provides a speech recognition system and method for recognizing sounds corresponding to particular phonemes contained in real-time speech signals received by the speech recognition system. (Phonemes are speech sounds or groups of closely related speech sounds regarded as a single sound) represented in phonetic transcription by a symbol.) The received speech signals are normalized and digitized by delta modulation techniques to obtain information representing sustained sounds contained in the speech signals. The speech signals are further analyzed and operated upon to obtain digital information representing the amplitude envelope of the speech waveform. The speech signals are also filtered to determine the presence or absence of frequency components exceeding a certain threshold, hereinafter referred to as "hissing" components, in the two to four kilohertz range. The digitized speech waveform information is utilized in conjunction with the above digitized amplitude and frequency information to match the speech sounds with stored phoneme characteristics on a real-time basis, to identify phonemes representing the speech sounds. The same information is utilized to identify significant transition points between phonemes and groups of phonemes. A real-time sequence of phoneme-representing signals is thereby produced (in response to the matching and transition point identifying operations) and utilized to control a phoneme printer. The phoneme printer is caused to print out, in real-time, groups of phonemes corresponding to uttered speech sounds grouped in accordance with various combinations of sustained slope relationships, amplitude features, and presence or absence of high frequency "hiss" components inherently contained in the uttered speech sounds.

Referring now to the drawings, and particularly to FIG. 1, the speech recognition system of the invention is utilized in conjunction with a telephone system. A hard-of-hearing person can hear or determine, by means of a blinking light system or a loud or percussion-type ringing system, that the telephone is ringing. (Alternatively, he dials the desired number if he wishes to initiate the call). He then places the telephone headset 16 into the receiving cups of a conventional acoustical coupler incorporated into system 10. The person then speaks into microphone 24, producing speech signals which are inputted to audio amplifier and transducer circuitry 22. Transducer circuitry 22 channels sound waves (indicated by arrows 30) representing the spoken material into the sending microphone of telephone headset 16. Voice signals coming over the telephone system from the remote party at the opposite end of the line are converted to sound by means of the earphone of telephone headset 16 and are converted to electrical speech signals by acoustical coupler 18. Acoustical coupler 18 inputs electrical signals emanating from the remote telephone to speech recognition system 20. Switches 21A and 21B are normally closed and switch 21C is normally open, unless the user wishes to use system 10 as a dictating machine.

Speech recognition system 20 produces phoneme signals which are inputted to phoneme printer 12. Phoneme printer 12 prints out real-time groups of phonemes corresponding to the speech received from the remote telephone on printout paper 26, which is observed by the deaf or hard-of-hearing person, as indicated by arrows 28. Thus, the deaf or hard-of-hearing person sees an instantaneous phoneme print-out of the conversation instead of hearing the sounds uttered by the person on the other end of the telephone circuit. The deaf or hard-of-hearing person can interrupt the conversation any time he wishes clarification of the printed phoneme message by simply speaking into microphone 24.

A proposed phoneme alphabet is shown in FIG. 2. Two groups of phoneme symbols are shown in FIG. 2, the first being transitional sounds. These transitional sounds involve short bursts of utterances which can not be sustained by the speaker for any long time duration. For example, the sounds represented by "D", "C", "B", and "J" contain "voice" frequency components. However, their related companion sounds, "T", "K", "D", and "CH" are voiceless equivalent sounds. These transitional sounds influence the features of any adjacent phoneme differently, depending on whether they preceed or follow that phoneme. Another group of sounds, designated sustainable sounds in FIG. 2, includes two subgroups, including non-vowels and vowels. All of the significant speech sounds in the English language are incorporated in FIG. 2. It is possible to add another twenty-five or so additional phonemes representing additional sounds capable of utterance by human speech organs, some of which sounds are included in other spoken languages.

The phoneme printer 12 in FIGS. 1 and 3 prints phoneme symbols corresponding to recognized phoneme sounds. In FIG. 2, each phoneme symbol is accompanied by a common English word which has one or more letters underlined to illustrate the sound represented by that phoneme symbol.

Referring now to FIG. 3, speech recognition system 10', which can be incorporated as the speech recognition portion of system 10 of FIG. 1, includes microphone 24 or other source of speech signals connected to the input of amplifier 32. The output of amplifier 32 is connected by means of conductor 33 to analog to serial digital converter circuit 34, hereinafter referred to as delta modulator 34. Conductor 33 is also connected to an input of a high frequency band pass filter 46 having a pass band in the range from 2-4 kilohertz. In the embodiment of FIG. 3, amplifier 32, is an audio preamplifier, and delta modulator circuit 34 includes a negative feedback circuit which adjusts the slope of the internal ramp signal in response to variations in the input of the audio speech signal on conductor 33, if delta modulator circuit 34 is the encoder portion of the Motorola MC3417 (or MC3418) continuously variable slope delta modulator/demodulator circuit. A low frequency filter 36 is connected to the negative feedback circuitry of the MC3417 to produce a amplitude envelope signal of the speech signal. The envelope signal is produced on conductor 38. It should be noted that for delta modulator circuits which do not have the above-mentioned negative feedback and variable slope ramp, the negative feedback must be incorporated in audio amplifier 32. In the embodiment of FIG. 3, however, the negative feedback can be conceptually considered a portion of amplifier 32, since the operation of delta modulator 34 is as if the speech signal on conductor 33 is a constant amplitude.

The serial digital output signal, hereinafter called the "delta signal", produced on conductor 44, represents the speech signal on conductor 33. The delta signal is provided as a serial, real-time digital input signal to microcomputer 52. Microcomputer 52 can be implemented by means of a Motorola MC6801 microcomputer (or by a number of other presently commercially available microcomputers).

The amplitude envelope on conductor 38 is inputted to a second delta modulator 40, also readily implemented by the encoder portion of a Motorola MC3417 continuously variable slope delta modulator/demodulator. Delta modulator 40 produces a serial digitized representation of the amplitude envelope signal, hereinafter called the "amplitude signal," on conductor 42. Conductor 42 is inputted to a second serial input of microprocessor 52.

The high frequency band pass filter 46 produces an output to threshold circuit 48, which produces a binary output pulse, hereinafter called the "hiss signal," on conductor 50 if the magnitude of the band pass filter output exceeds a predetermined threshold level. Conductor 50 is provided as a third serial input to microcomputer 52. An output port 62 of microcomputer 52 is connected to phoneme printer or other phoneme interpretive device 12'. An auxiliary memory 58 is connected by means of bus 60 to data and address ports of microcomputer 52 for storing additional data and/or software, should the internal random access memory and/or read only memory internal to microcomputer 52 be inadequate.

Figure 4:
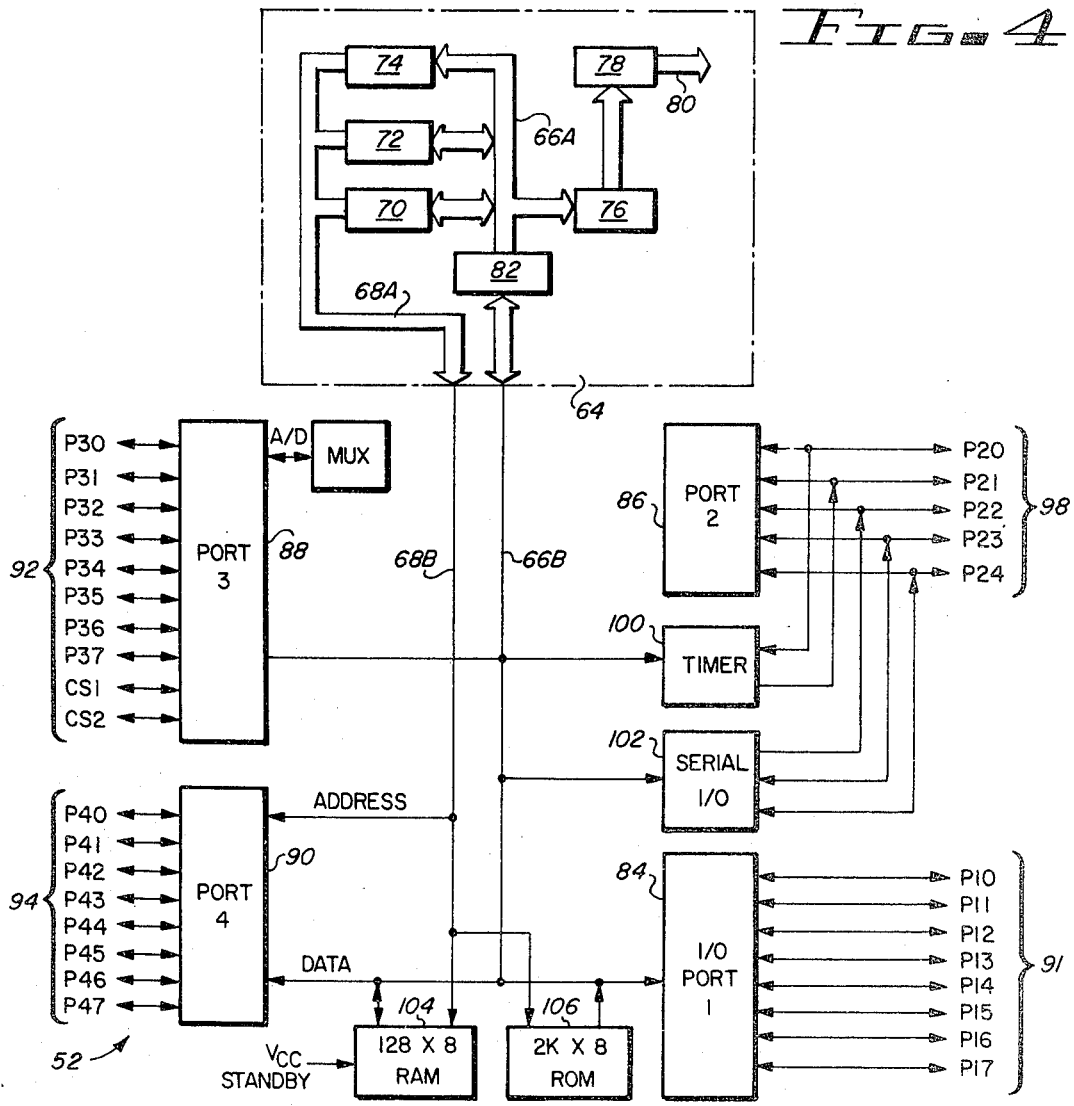
FIG. 4 is a detailed block diagram of the microcomputer of FIG. 3.
Figure 5:
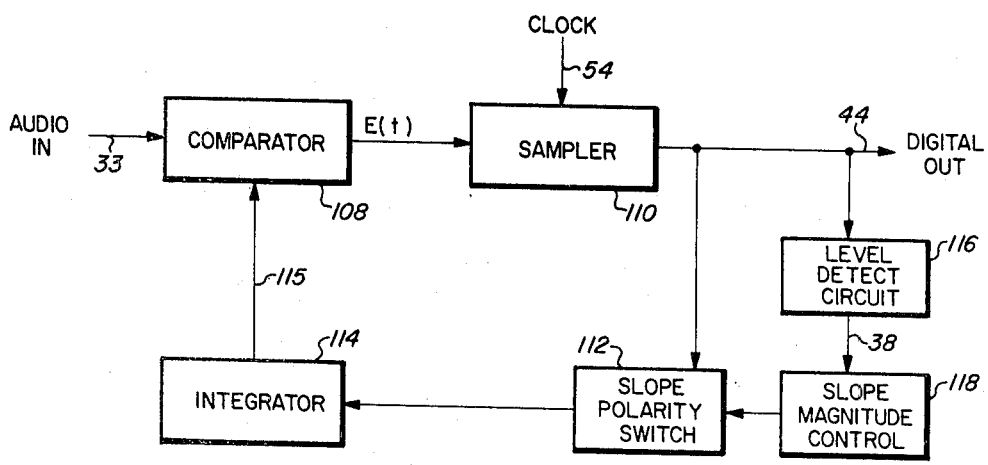
FIG. 5 is a detailed block diagram of the delta modulator circuit of FIG. 3.

Before describing the operation of the speech encoding system of the invention, it is helpful to further describe the structure of the speech recognition system of FIG. 3 by referring to FIGS. 4 and 5, which show detailed block diagram of the primary internal features of delta modulator circuits 34 and 40 and microcomputer 52, respectively.

Referring now to FIG. 4, microcomputer 52 includes a basic processor section 64, including the conventional classical elements of a processor, including an "internal" bidirectional data bus 66A connected to a programmed counter 74, a plurality of various registers 72 (such as index registers, accumulator registers, temporary registers, and the like), an arithmetic and logic unit 70, which is coupled to the accumulator registers, and a data bus buffer circuit 82 connecting data bus 66A to "external" bidirectional data bus 66B. Arithmetic logic unit 70, register section 72, and program counter 74 are connected to an "internal" address bus 68A, which is coupled by means of buffer circuitry to "external" address bus 68B. Internal data bus 66A is connected to instruction register and instruction decoder circuitry 76, which produces signals which are inputted to control circuitry 78. Control circuitry 78 produces control signals on an output bus 80, various conductors of which are routed to the various data transfer devices in microcomputer 52 to effect execution of instructions therein. The structure and operation of portion 64 of microcomputer 52 is well understood in the art, and is further described in U.S. Pat. No. 3,962,682, by Thomas H. Bennett, issued June 8, 1976, and incorporated herein by reference. Microcomputer 52 further includes a random across memory 104 and a read only memory 106 having data terminals connected to data bus 66B and address inputs connected to address bus 68B. Microcomputer 52 further includes four input/output ports 84, 86, 88, and 90, which can be utilized to receive or send data information to external devices. Address information for addressing peripheral devices or memory locations can be outputted from both ports 3 and 4. Data can also be outputted from ports 3 and 4 in parallel format. Serial data can be received via port 2. Microcomputer 52 includes a high speed internal timer 100, which can be controlled by special timer instructions to measure pulse widths and time intervals of pulses and times of transitions received on several of the lines connected to port 86. Thus, high speed serial input data can be received, and the level transitions thereof can be precisely measured by means of timer 100 and stored for analysis by the operating program.

Timer 100 is utilized to produce a 50 kilohertz clock signal on conductor 54, which controls the sampling rate of delta modulator 34. Timer 100 is also programmed to produce a 200 Hertz clock signal on conductor 56, which establishes the sampling rate of delta modulator 40. Microcomputer 52 is also capable of performing a fast multiply instruction, which, as subsequently explained, is useful in computing input signal waveform characteristic ratios useful in identifying and matching sounds to stored phoneme ratio characteristics, hereinafter called phoneome ratios. Referring now to FIG. 5, delta encoder 34, which is essentially the same as delta encoder 40, includes a comparator 108 having one input connected to speech signal conductor 33 and another input connected to the output of integrator circuit 114. The output of comparator 108 is connected to the input of sampling circuit 110, which is clocked by the 50 kilohertz sampling signal produced on conductor 54 by microcomputer to cause the output of comparator 108 to be sampled at a fifty kilohertz rate to produce a sampled comparator output on conductor 44. The signal on output conductor 44 will be a logical "one" or a logical "zero", depending upon whether the speech signal on conductor 33 is greater than or less than the output signal produced by integrator circuit 114. The output signal produced by integrator 114 is a ramp signal whose slope is controlled by slope polarity switch circuit 112. Slope polarity switch circuit 112 causes the polarity of the slope of the ramp signal produced by integrator 114 to be reversed each time the logic level on output conductor 44 changes. The magnitude of the slope of the ramp signal produced by integrator 114 is controlled by slope magnitude control circuit 118. Level detect circuit 116 is responsive to the magnitude of the speech signal on conductor 33, and provides feedback via conductor 38 to slope magnitude control circuit 118 to cause the slope of the ramp voltage produced by integrator 114 to compensate for variations in amplitude of the speech signal on conductor 33. This has the same effect as negative feedback circuitry would have in amplifier 32 to normalize the amplitude of the speech signal on conductor 33. Filter 36 (FIG. 3) is incorporated within level detect circuitry 116. Level detect circuitry 116 also includes circuitry for adapting to varying overall amplitude of speech signal 33.

It should be noted that the terms "delta modulation" or "delta modulation" as used herein can refer to any technique which includes operating upon a sequence of analog signals to detect portions of the analog signals undergoing major slope changes and producing a sequence of digital pulses, wherein the edges of the digital pulses correspond in time to the beginnings and ends of the portions of the analog signals undergoing the major slope changes.

FIG. 7 shows a sample speech waveform 33B, representing a particular phonemic sound and a ramp voltage 115A produced on conductor 115 by integrator 114 of delta modulator circuit 34. The corresponding output signal (or delta signal) produced on output 44 of delta modulator 34 is shown by waveform 44B in FIG. 7. The operation of the delta modulator circuit is that if waveform 115A is positive-going, it increases to the point at which it exceeds the instantaneous value of speech signal 33B. The polarity of the output of comparator 108 then reverses, and sampling circuit 110, which is essentially a flip flop synchronize to the sampling signal on conductor 54, switches on the leading edge of the next pulse of the sampling signal on conductor 54, causing slope polarity switch 112 to reverse the polarity of the slope of ramp signal 115A. Ramp signal 115A then decreases until it is less than the instantaneous level of speech signal 33B, at which point the output of comparator 108 again changes, causing another reversal of polarity of the slope integrator ramp signal 115A. Thus, integrator output ramp signal 115A closely "tracks" or follows speech signal 33B, and therefore contains essentially all of the significant phonemic information thereon. Delta modulator output waveform 44B, produced on output 44, is a logical "one" when integrator output 115A is positive-going, and is negative when the slope of integrator output signal 115A is negative. Consequently, delta modulator serial output 44B contains the same phonemic information as ramp signal 115A. This is a fact well known in the art, since such signals are commonly decoded to reconstruct the analog speech signals with no significant loss of phonemic information.

Clearly, the significant phonemic information is contained in waveform 34B with far less digital data than would be required utilizing the pulse coded modulation techniques ordinarily utilized in prior speech recognition systems.

Microcomputer 52 has the capability of measuring real time pulse width measurements. The requirements of the speech recognition system of FIG. 3 are that real time pulse width measurements must be made where the positive and negative transitions of the serial digital input signals may be as close as 16 microseconds apart or as far apart as several seconds, wherein the total number of interruptions for time measuring purposes may exceed 30,000 per second. The signals on conductors 50 and 42 are very slow, and can be tested by the main operating program whenever it is necessary to determine the information from such conductors. However, the high speed delta signal on conductor 44, representing the delta modulator output, must have the time of every transition thereof determined by timer 100, and each such time must be stored and made available for immediate use by the operating program.

FIG. 6 shows typical corresponding waveforms which appear at conductors 33, 44, 38, 42, at the output of filter 46, and on conductor 50. Alphanumeric reference numerals having a numeric label corresponding to the conductor, followed by the letter A, are utilized to designate the above waveforms in FIG. 6. Waveform 33A shows a typical vowel sound of the input speech signal, including a gradual transition and amplitude build up followed by a glide into a nasal sound, followed by a "pause" or "stop". The stop is followed by a fricative. The vowel and nasal sounds are encoded by delta modulator 34 to produce delta signal waveform 44A, as previously explained with respect to FIG. 7 and the operation of the delta modulators.

Delta signal waveform 44A of FIG. 6 shows the several typical expanded portions of an output of delta modulator 34. The expanded portions are indicated by arrows 124A and 128A, indicating the portions of speech waveform 33A represented by the expanded portions of delta signal waveform 44A. The delta modulator response to the fricative portion of speech waveform 33A, i.e., the "hiss" components thereof, is indicated by reference numeral 130A.

The amplitude envelope signal corresponding to speech waveform 33A is shown by amplitude signal waveform 38A, which has a large "hump" portion 124B representing the "glides" at the beginning and end of the vowel sound. Hump portion 124B also represents the amplitude of the speech signal 33A during the sustained portion of the vowel sound. The amplitude of the nasal portion of speech waveform 33A is represented by reference numeral 128B, and the amplitude of the fricative portion is indicated by reference numeral 130B. Envelope waveform 38A is delta modulated to produce amplitude signal waveform 42A, which contains essentially the same phonemic information as envelope signal 38A. The output of band pass filter 46 is shown by waveform 46A, and responds to the fricative burst of speech of waveform 33A, as indicated by "pulse" 130C. The threshold level of circuit 48 is indicated by reference numeral 130D. The output of threshold circuit 48 is indicated by waveform 50A, which simply is indicated by reference numeral 130E.

The delta signal waveform 44A produces information which is sufficient to adequately characterize many sustainable sounds, such as vowel sounds and nasal sounds, to permit them to be distinguished from each other and to permit comparison of such sounds to stored characteristics representing the various phonemes of FIG. 2. The delta modulator output 44 is utilized to produce information which represents the major slope transitions in a speech waveform. (A major slope transition is any major change in slope of the speech waveform, such as a slope polarity reversal, or a change from a flat portion to a steeply rising portion of the speed waveform).

Referring to FIG. 7, the latter task is accomplished by several steps performed in microcomputer 52. The first step is to produce a sequence of logic states, designated by the logic variable S and represented also by waveform 44C in FIG. 7. Logic variable S is a logical "zero" as long as no ramp signal produced by integrator 114 lasts more than a predetermined number of sampling time periods, in this case, two sampling time periods. Logic variable S then remains at a logical "one" until an opposite polarity slope is sustained for at least two (in this case) sample times. The S waveform of FIG. 7 thus identifies major slopes of speech input waveform 33B. For example, pulse A of digital waveform 44C identifies the presence of a major slope A' of speech signal 33B. Similarly, pulse B of waveform 44C identifies another major slope B' of speech waveform 33B. Negative pulse C identifies a major negative transition C' of speech waveform 33B, etc. Thus, it is seen that the series of positive and negative levels of S waveform 44C identify the major positive and negative slopes of speech waveform 33B. Information corresponding to the S waveform 44C is produced in response to the serial delta modulator output waveform 44B by the operating algorithm and microcomputer 52, and is stored as binary states of assigned control bits in a memory location of the random access memory 104 of microcomputer 52.

Similarly, a second waveform, referred, referred to as an R waveform and indicated by reference numeral 34D detects the major flat levels of speech waveform 33B by assuming a logical "one" level any time the ramp signal produced by integrator 114 (FIG. 5) changes polarity a predetermined number of consecutive sample times (in this example, two consecutive times), and remains at a logical "one" until such time as the ramp signal polarity fails to be reversed for such predetermined number of sample times. Thus, positive pulse D of R signal waveform 44D corresponds to flat level D' of speech waveform 33B. Similarly, the pair of pulses E, the group of pulses F, pulse G, and pulse H represent, respectively, the "flat" portions D', E', F', G', and H' of speech waveform 33B.

According to the present invention, it has been found that the major slope transitions, i.e., changes of slope from the flat portions of the speech waveform to the major rising and falling portions thereof, essentially provide the necessary information to characterize the speech input waveforms to permit identification of phonemes contained therein. These slope transition points are located in real time, and are utilized to compute the various feature ratios with far less encoding and "number-crunching" than for the prior art.

The above mentioned speech waveform characteristic ratios are hereinafter referred to as "features". They are computed from information contained in the R and S logic variable waveforms of FIG. 7 which correspond to information "extracted" from the delta modulator output waveform, such as 33B in FIG. 7.

The feature extraction process wherein the above features are extracted or determined from the delta modulator output signal includes the following steps. The serial delta modulator output signal is monitored by timer 100 of FIG. 4, and the duration of each positive pulse is measured and temporarily stored. The time between each pulse is also measured and temporarily stored. As previously explained, this information is operated upon to produce information represented by the logic variables S and R, whose values are shown in the corresponding waveforms of FIG. 7. Once the R and S variable values are obtained and stored, the data corresponding to the individual pulses of the delta signal waveform are no longer retained. The information corresponding to the values associated with the S and R variables are stored in two memory stacks, referred to hereinafter as the "S stack" and the "R stack", respectively. Each such stack stores the sixteen most recent "segments" of the corresponding logic variables S and R, respectively. Each such "segment" corresponds to a time interval during which the corresponding variable (S or R) has a particular logic level, either a "one" or a "zero". Thus, a positive S segment is represented by a time interval during which the value of the variable S is a logical "one"; a negative S segment is a time interval during which the logical variable S is a logical "zero."

Positive and negative R segments are similarly defined. Thus, the R stack contains the information representing the last sixteen consecutive R segments and the S stack contains information representing the last sixteen S segments. Together, the two stacks contain information which describes the major transitions, major slopes, and major flats of the original speech waveform. Such information is stored in digital form wherein it can be utilized to compute the previously mentioned "features," or normalized speech waveform characteristic ratios.

The feature extraction subroutine of the phoneme recognition algorithm interrogates the S stack to compute the "pitch", which is defined as the period of the speech sound being presently received and analyzed by the speech recognition system. The pitch is computed by interrogating the S stack and the R stack to find segment relationships which are identical or nearly identical to the most recent S segment, and by summing all S segments, including the most recent S segment, which occurred subsequent to such identical or nearly identical segment.

The algorithm also interrogates the S stack to determine the longest and second longest positive S segments, the longest and second longest negative S segments, and also interrogates the R stack to determine the longest positive R segment and longest negative R segment, and divides each of such segments by the appropriate S pitch to obtain the desired time-normalized characteristic ratios, or features, of the presently analyzed sound from the incoming real-time speech signal. Of course, other features than these could also be computed, if necessary to more accurately characterize certain sounds in order to enable their detection. The extent of characterization required is a matter which will have to be determined by subsequent research and experimentation.

The algorithm maintains running values of all of the above time-normalized characteristic ratios or features by temporarily storing all such features and updating them for each new major "S" slope or major "R" flat, as successive incoming sounds are analyzed.

The updated time-normalized characteristic ratios or features are then utilized for comparison with corresponding stored phoneme ratios in accordance with the phoneme recognition decision tree.

The widths of various ones of the pulses can be divided by the period of the repetitive waveform to provide characteristic ratios which are independent of pitch, according to the present invention. These characteristic ratios can also be computed for widths of different pulses to each other for the S or R waveforms. Also, such ratios can be computed between a pulse of the S waveform and a pulse of the R waveform. All such ratios will be independent of pitch. A certain amount of yet to be performed research must be carried out to determine which ratios most distinctly distinguish each of the major uttered sounds in spoken langage from other uttered sounds in the spoken language. In accordance with the present invention, it has been found that the ratios involving the three or four most significant dwells or transition durations or relative locations in a speech waveform are sufficient to characterize the different sounds used in spoken language. According to the invention, the sounds corresponding to each of the phonemes in FIG. 2 are characterized by such ratios (which ratios are herein referred to as "phoneme ratios") and are stored in the memory of microcomputer 52. Such ratios are computed on a real time basis for the incoming speech waveforms, and these ratios are compared, in an order determined by the operating algorithm (subsequently discussed), with the stored phoneme ratios to select the phoneme signals to be outputted or the phonemes to be printed out.

The above computed characteristic ratios are compared with the above-mentioned stored phoneme ratios in accordance with a phoneme recognizer algorithm subsequently described, which operates in accordance with the phoneme recognition decision tree shown in FIG. 8. In order to accomplish successful real time phoneme sound classification and identification, the phoneme decision tree must test and classify the computed ratio features of the presently received phoneme sound in an efficient order in order to "keep up" with the speaker. Further, high speed decision making in the classifying and comparing or correlating processes provides additional computing time which is necessary for segmentation analysis and control of print-out.

The average decision speed is improved by starting the comparison procedure with the most frequently used phonemes in the American English language. In FIG. 8, the phoneme decision tree is arranged as a plurality of "branches" each having the phoneme N, usually the most common sound in spoken English, as the starting point. The size of the rectangles containing the various phonemes illustrate the frequency of occurrence of that phoneme in the American English language. Phonemes having prominent features are clustered within individual "branches" of the decision tree in descending order of frequency of usage, so that nor more than six sets of tests need be made to recognize or identify even a rather infrequently used phoneme, such as the "WH" sound in the word "when". For example, the phonemes including rectangles 204, 206, 208, 210, and 212 constitute a "branch". Arrow 214 indicates an exit from the above branch and also indicates a failure of the algorithm to recognize the tested features during the subject pass through that branch. Rectangles 204, 220, and 224 constitute a second branch. Sub-branches, such as 232, 234, extend, in some instances, from other branches.

Figure 8:
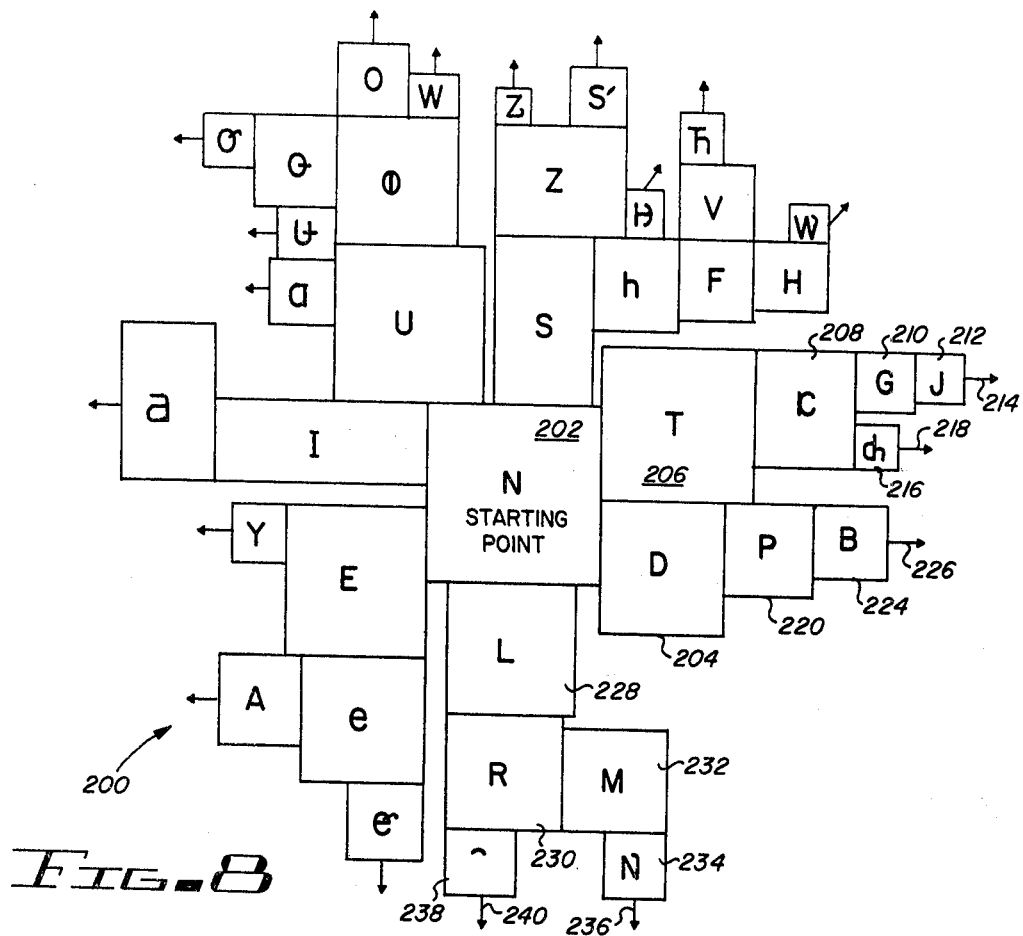
FIG. 8 is a diagram of a phoneme recognition decision tree implemented by operation of the speech recognition system of FIG. 3.
Figure 9:
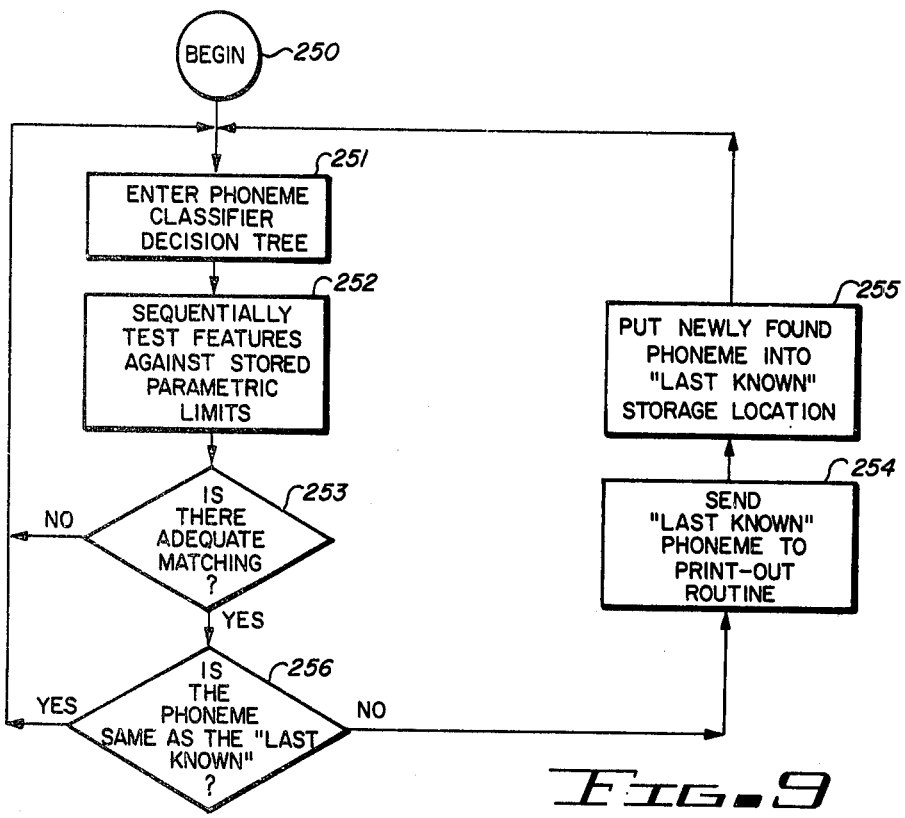
FIG. 9 is a flow diagram setting forth the basic operation of the speech recognition system of FIG. 3.

The general sequence of basic operating steps of the phoneme recognition algorithm is indicated in the flow diagram of FIG. 9. The algorithm begins at 250, and enters the phoneme classifier decision tree, as indicated by block 251. The computed, time-normalized characteristic ratios for the presently-being-analyzed phoneme are tested in accordance with the phoneme decision tree of FIG. 8. If there is an adequate matching between the characteristic ratios of the phoneme sound being tested, those characteristics are also compared to the ratio characteristic of the "last known" phoneme for which an adequate matching was obtained, as indicated in decision blocks 253 and 256. If an adequate matching of the computed characteristic ratios with the stored phoneme ratios is not obtained in accordance with decision block 253, the algorithm re-enters the phoneme classifier decision tree and makes a pass through a related, but different branch, in accordance with additional "cues" (subsequently explained) derived from the high frequency "hiss signal" and/or the serial digital "amplitude signal" received by microcomputer 52 to recognize certain transition and amplitude features of the speech input waveform.

As indicated by decision block 256, if the phoneme sound ratios are "suitably matched" in decision block 253, and are found to be the same as those of the "last known" phoneme, which are temporarily stored in a predetermined location of memory, the algorithm of FIG. 9 does not cause the phoneme to be printed out, but instead it re-enters the phoneme decision tree at block 251 for further analysis, so that a sustained sound causes its corresponding phoneme symbol to be printed out only once, rather than a number of times depending upon the algorithm execution rate and the duration of the sound. Only when the newly matched phoneme is not the same as the last known phoneme will information identifying the last known phoneme be routed into the print-out routine. The newly matched phoneme is stored in the last known phoneme memory location until a new phoneme sound is "matched" or recognized, as indicated by decision blocks 254 and 255. The algorithm then re-enters the phoneme decision tree of block 251.

Thus, it is seen that the algorithm avoids multiple printings of the same phoneme symbol over long, "drawn out" or sustained sounds, which are prevalent in the glides characteristic of American speech when a series of two or three sustained sounds are "blended" together in a gliding manner over a period of several seconds. This prevents extraneous or excessive numbers of phoneme symbols from being printed, thereby making the printed phoneme message more readable.

Identification of and print-out control for phoneme symbols which do not correspond to sustained voice information is accomplished by means of the information contained in an amplitude signal such as waveform 42A of FIG. 6. Such digitized amplitude information is utilized to provide primary cues for substantiating that new valid phoneme sounds presently are being uttered and identified by the sustained voice signals represented by the delta signal by identifying the typical glides which ordinarily occur as speech progresses from one meaningful phoneme sound to another. The amplitude signal is also analyzed by the algorithm to differentiate between high and low energy fricative sounds such as "S" (a high-energy fricative), and "F" (a low energy fricative). These fricatives contain rapidly oscillating waveforms at the higher end of the voice frequency spectrum, as indicated in waveforms 33A, 44A, 38A, and 46A of FIG. 6. Such fricatives are identified by the "hiss signal" (derived from the output of the high frequency band pass filter 46 of FIG. 3) input to microcomputer 52 to assist in identification of high frequency "noise" or "hiss" signals whenever such sounds exceed a prescribed minimum aplitude. It should be noted that the amplitude envelope (e.g., 38A of FIG. 6) is quite slow; its variations represent the stressing and syllabic or prosodic movements of human speech organs, which movements usually accompany transitions between meaningful phoneme sounds. (Analog conversion of the amplitude envelope waveform 38A can be accomplished at a much lower sample time than for speed signal 33A. Thus, microcomputer 52 generates a relatively slow 200 Hertz sample time clock on conductor 56 to effect analog to digital conversion of the amplitude envelope signal.)

Figure 10A:
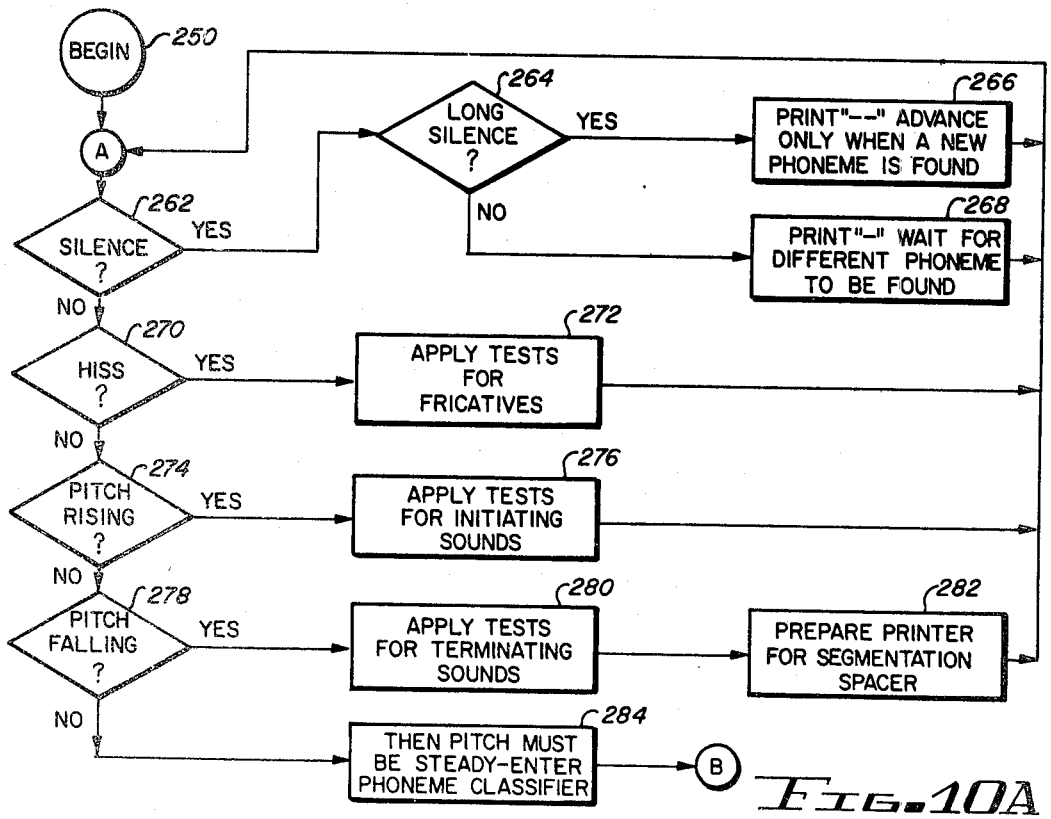
FIGS. 10A and 10B constitute a more detailed flow diagram useful in explaining the operation of a representative portion of the phoneme classifier portion of the operating algorithm of the invention.
Figure 10B:
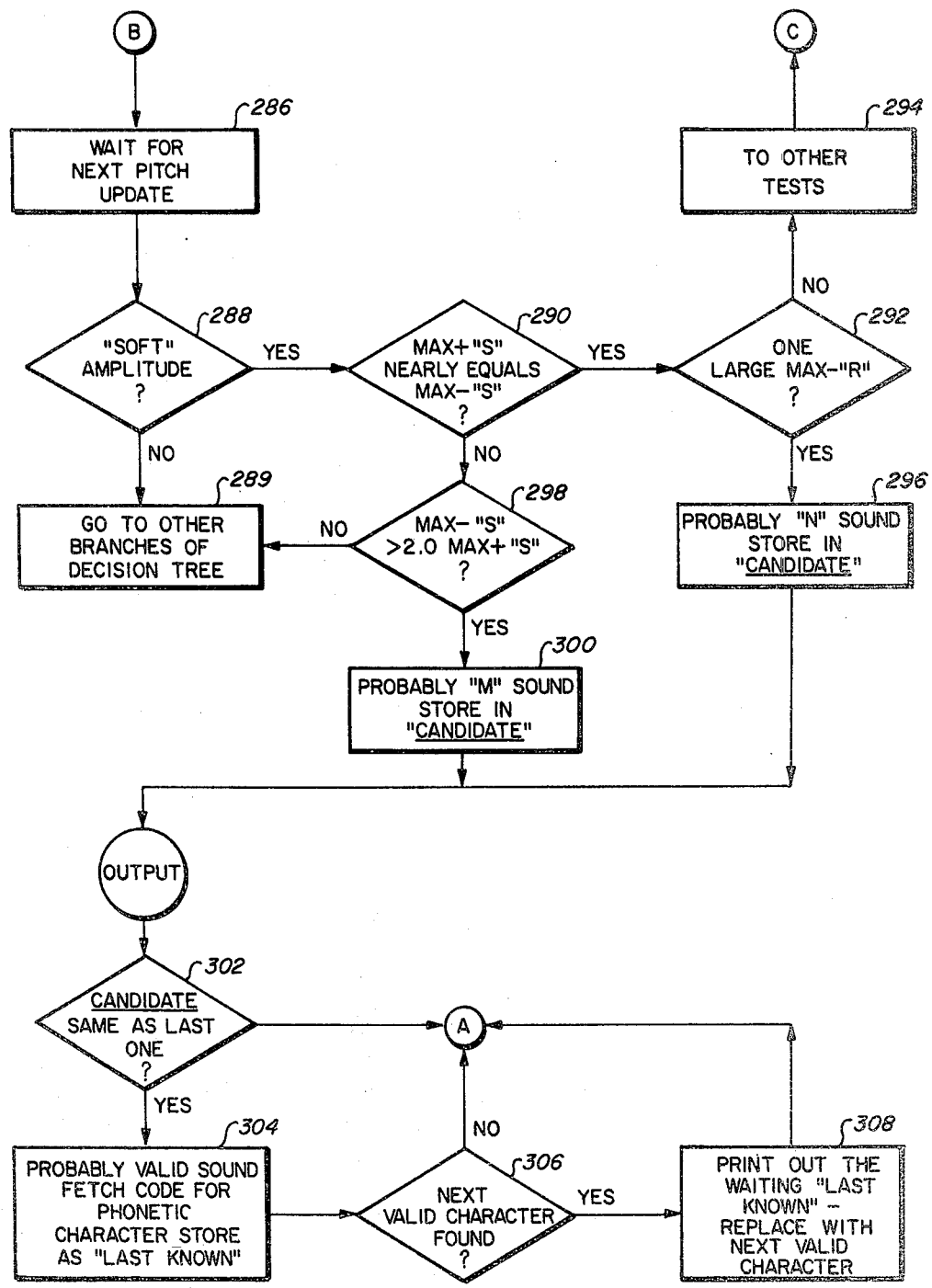

The phoneme classifier decision tree is partially shown in flow diagram of FIGS. 10A and 10B, and is entered at entry point 250 after the previously described feature extraction process has been completed for a presently-being-analyzed sound of the incoming speech signal.

The algorithm first tests the amplitude information corresponding to the present sound, as indicated by decision block 262. If the amplitude is very low, indicating only a background noise level, the algorithm determines whether the present silence is a "long" silence by comparing the present amplitude to previously stored amplitude information, as indicated by decision block 264 in FIG. 10A. The algorithm then prints out the series of dashes, as indicated by block 266, and, if the silence is not a "long" silence, the algorithm causes a single dash to be printed out, as indicated by block 268. In either case, the algorithm returns to entry point A. If the decision of decision block 262 had been "no," the algorithm determines whether there is a high frequency "hiss" component of the present sound, as indicated by decision block 270. If so, the algorithm branches to a subroutine which applies various tests for fricatives, as indicated by block 272. These tests, although not described in detail herein, serve as cues for identifying transitions and distinguishing phonemes.

If no "hissing" sound has been detected by decision block 270, the algorithm then compares the present pitch with previously stored pitch information to determine if the pitch is rising, as indicated by decision block 274. If the pitch is rising, the algorithm applies tests for "initiating sounds", i.e. initial "P", "D", "G" and "B" sounds, as indicated in decision block 276. If the pitch is not rising, the algorithm determines whether the pitch is falling, utilizing the presently calculated pitch and previously stored pitch information. If the pitch is determined to be falling (decision block 278), the algorithm applies tests for indication of termination of a sound, as indicated by blocks 280 and 282, and enters a subroutine for preparing the printer for producing a space to segment the previous phoneme group from the subsequent phoneme group. If the pitch is not falling, as determined by decision block 278, the algorithm then enters the phoneme decision tree portion of the algorithm, which portion operates in accordance with the phoneme decision tree of FIG. 8.

This portion of the algorithm is shown in the flow diagram of FIG. 10B.

Referring now to FIG. 10B, the algorithm waits for the next updating of the pitch, as indicated by block 286.

If the algorithm then finds that the amplitude is "soft" (this means that the present amplitude is less than twenty-five percent of its maximum value), as indicated by decision block 288, the algorithm makes a pass through the branch of the phoneme decision tree of FIG. 8 including blocks 202, 228, 232, and 234, which represent the nasal phonemic sounds.

The flow diagram of FIG. 10B does not attempt to set forth the matching process for all branches of the decision tree of FIG. 8. If the amplitude is determined not to be "soft" by decision block 288, block 289 then indicates that various other branches of the phoneme decision tree of FIG. 8 are entered by the algorithm, in accordance with other priorities built into the algorithm or on the basis of additional cues tested by the algorithm.

Assuming now that the present sound has a "soft amplitude", as determined by decision block 288, the algorithm then compares the maximum positive S ratio (i.e., the time of the maximum positive S segment divided by the pitch) with the maximum negative S ratio to determine if the waveform has an acceptable "balance" between the major positive and negative slopes characteristic of the phonemes "N" or "NG". If not, the algorithm enters decision block 298 and determines whether the maximum negative S ratio is greater than twice the maximum positive S ratio, and if it is not, branches to block 289 to test other branches of the phoneme decision tree. If the result of the test of decision block 298 is affirmative, however, the algorithm makes the determination that the presently tested sound is probably a "M" sound (block 300), and stores an identifier or code representing the "M" phoneme in a memory location called "candidate", and goes from there to the output routine. The output subroutine compares the code with the previously stored code stored in the location "candidate", as indicated by block 302, and if a match is not present, the algorithm returns to point A of FIG. 10A to make another pass. However, if the code corresponding to an "M" phoneme is the same as the previously stored code, the phoneme classifier portion of the algorithm has chosen the same phoneme twice in a row, and the algorithm concludes that the proper phoneme has probably been selected, and, in response to such decision, fetches an address code for the "M" phoneme character and stores the code in a memory location called "last known phoneme", as indicated in block 304, and enters decision block 306. Decision block 306 makes the determination whether the next valid character has been identified, and if it has not, enters the algorithm at point A of FIG. 10A. If the next valid character has been found, the algorithm enters block 308, causing the code stored in the memory location last known to be printed out and replaced with the next valid character, as previously described with reference to FIG. 9.

If the conclusion of decision block 290 has been "yes, 38 the algorithm would have determined whether the present sound has only a single large maximum negative R ratio, and if so, would have made a determination that the present sound was probably a N sound, as indicated in block 296, and would have stored an identifying code in the location condidate and branched to the output subroutine. If the result of decision block 292 had been "no", the algorithm would have branched to block 289 to test for the "NG" phoneme.

Various approaches to making the decision when to advance the paper of the phoneme printer may be utilized for different applications. For the above described embodiment utilized in conjunction with a public telephone system to permit deaf or hard-of-hearing persons to utilize conventional telephones, a narrow paper which contains short lines is believed to be more readable. One approach to determining when to advance the paper can be based on counting the number of characters, the number of consonants, or the number of syllables. Combinations of these approaches can also be utilized, for example, advancing the paper after completing the syllable identified as complete after a certain number of characters have been printed. However, considerable research will need to be performed to determine the most suitable basis for advancing paper without wasting undue amounts of paper yet enhancing or maintaining the readability of the phoneme print-out.

The speech recognition system and method of the invention can be readily incorporated in a dictating machine, as indicated in FIG. 1 by means of the alternative dotted line connection, indicated by reference numeral 23, connecting microphone 24 directly to speech recognition system 20 and disconnecting transducer 22 and acoustical coupler 18 from speech recognition system 20, as indicated by the dotted "X's" 21. The main difference from the embodiment of FIG. 1 is that no acoustical coupler is required. The microphone signals are inputted directly to the speech recognition system, which produces signals which drive the phoneme printer.

Instead of driving a phoneme printer, the output signals from the speech recognition system can be utilized to directly control digitally controlled machinery by connecting the output data port 62 of microcomputer 52 to other suitable electromechanical apparatus having digital input controls as indicated in FIG. 3.

A useful variation of the speech recognition system as previously described includes provisions of switches 21A, 21B, and 21C, as shown in FIG. 1, to permit the user to use the system 10 as a dictating machine or as a training device. A hard-of-hearing person untrained in reading the phoneme symbol printout of printer 12 can simply manually open switches 21A and 21B and close switch 21C. He or she can then speak into microphone 24 and practice reading the phoneme symbol printout.

It should be noted that the phoneme recognition system disclosed herein is capable of recognizing and interpreting characteristic sounds which are mechanically produced or are produced by other beings (such as animals) or sources, or sounds produced in nature, such as thunder. For example, various mechanical devices make characteristic sounds which may have specific meanings. A particular type of mechanically produced sound may indicate a particular emergency situation exists or may call for a particular type of corrective action to be taken. Such characteristic non-speech sounds, whether produced by machines, nature, or other non-human sources, can be categorized in the same manner that phonemes of human speech are categorized. Such characteristic sounds are referred to herein as "mechanical phonemes."

In a manner entirely analogous to that explained above, the system of the present invention can detect major slope changes of analog signals representing sounds which are produced mechanically or otherwise, and can produce and store digital information representative of the characteristics of the incoming sounds. Mechanical phoneme ratios analogous to the phoneme ratios described herein before can be calculated and compared to a predetermined stored table of characteristic mechanical phoneme ratios to permit identification and classification of distinct incoming mechanical sounds and thereby permit generation of appropriate electrical control signals in response to the incoming mechanically produced sounds.

I claim:

1. A method for producing a signal representing a characteristic sound contained in a stream of sound signals, said method comprising the steps of:
   (a) producing a first sequence of analog signals representing said sound signals;
   (b) operating upon said first sequence of analog signals to detect portions of said analog signals undergoing major slope changes and producing a sequence of digital pulses, the edges of said digital pulses corresponding in time to the beginnings and ends of said portions of said analog signals;
   (c) operating upon said sequence of digital pulses to detect major slope transistions of said analog signals;
   (d) measuring time intervals between predermined ones of said detected major slope transitions;
   (e) computing a plurality of waveform characteristic ratios between predetermined ones of said time intervals;
   (f) comparing said waveform characteristic ratios with a plurality of stored characteristic ratios to determine if said waveform characteristic ratios match any of said stored characteristic ratios; and
   (g) producing a signal representing a sound corresponding to a matching one of said characteristic ratios.

2. The method of claim 1 further including a plurality of feature extraction steps after said time interval measuring, said feature extraction steps including:
 (a) producing a first sequence of first logic variable segments each defined by a respective one of said time intervals and storing said first sequence of first logic variable segments in a first memory stack;
 (b) determining a period of said analog speech signals by summing the ones of said stored first logic variable segments between a most recently stored one of said first logic variable segments and a like previously stored one of said first logic variable segments; and
 (c) dividing predetermined ones of said first logic variable segments by said period to obtain certain ones of said speech waveform characteristic ratios.

3. The method of claim 1 wherein said comparing is in accordance with a sound classifier subroutine, said sound classifier subroutine selecting various ones of said stored characteristic ratios for comparision with said waveform characteristic ratios according to a sound classifier decision tree, said sound classifier decision tree including a plurality of branches each representing a plurality of characteristic ratios of related sounds, the characteristic ratios of each branch being selected in decreasing order of their average frequency of occurrence.

4. The method of claim 3 further including the steps of:
 (a) producing an amplitude envelope signal representing amplitude variations of said sound signals;
 (b) serially encoding said amplitude envelope signal to produce a second sequence of serial digital pulses representing amplitude information of said amplitude envelope signals;
 (c) analyzing said second sequence of serial digital pulses to produce transition information representing transitions and transitional glides of said sound signals;
 (d) utilizing said transition information in said sound classifier subroutine to aid in selecting one of said branches; and
 (e) sequentially selecting stored characteristic ratios in said branch for said comparing.

5. The method of claim 3 further including the steps of:
 (a) detecting frequency components of said sound signals in a predetermined frequency range and exceeding a predetermined threshold magnitude;
 (b) producing a digital signal representing said detecting frequency component; and
 (c) utilizing said frequency component representing digital signals in said sound classifier subroutine to aid in selecting one of said branches and in distinguishing between predetermined ones of said stored characteristic ratios and said waveform characteristic ratios.

6. A system for producing a signal representing a characteristic sound contained in a stream of sound signals, said system comprising:
 (a) first means for producing a first sequence of analog signals representing said sound signals;
 (b) means for operating upon said first sequence of analog signals to detect portions of said analog signals undergoing major slope changes and producing a sequence of digital pulses, the edges of said digital pulses corresponding in time substantially to the beginnings and ends of said portions of said analog signals;
 (c) means for operating upon said sequence of digital pulses to detect major slope transitions of said analog signals;
 (d) means for measuring time intervals between predetermined ones of said detected major slope transitions;
 (e) means for computing a plurality of waveform characteristic ratios between predetermined ones of said time intervals;
 (f) means for comparing said waveform characteristic ratios with a plurality of stored characteristic ratios to determine if said waveform characteristic ratios match any of said stored characteristic ratios; and
 (g) means for producing a signal representing a sound corresponding to a matching one of said characteristic ratios.

7. The system of claim 6 wherein said major slope change detecting means includes:
 (a) means for comparing a positively and negatively ramping signal to said sequence of digital pulses;
 (b) means for periodically comparing the instantaneous level of said analog signals at a predetermined rate with the instantaneous level of said ramping signal;
 (c) means for reversing the slope of said ramping signal if said ramping signal is positive-going and exceeds said instantaneous level, and reversing the slope of said ramping signal if said ramping signal is negative-going and is less than said instantaneous level; and
 (d) means for producing said digital pulses in accordance with said slope reversing.

8. The system of claim 6 further including means for producing an amplitude envelope signal representing amplitude variations of said sound signals, means for operating upon said amplitude envelope signal to produce a second sequence of digital pulses representing amplitude information contained in said amplitude envelope signal, and means for determining transition points in said sound signals in response to said second sequence of digital pulses.

9. The system of claim 8 wherein said waveform characteristic ratio computing means includes feature extraction means, said feature extraction means including:
 (a) means for producing a first sequence of first logic variable segments each defined by a respective one of said time intervals and a logic state determined by the slope of said ramping signal if said slope remains unreversed for a predetermined time;
 (b) first means for storing said first sequence of first logic variable segments;
 (c) means for determining a period of said analog speech signals by summing the ones of said stored first logic variable segments between a most recently stored one of said first logic variable segments and a like previously stored one of said first logic variable segments; and
 (d) means for dividing predetermined ones of said first logic variable segments by said period to obtain certain ones of said waveform characteristic ratios.

10. The system of claim 9 wherein said waveform characteristic ratio computing means further includes:
 (a) means for producing a second sequence of second logic variable segments each defined by a respective one of said time intervals;
 (b) second means for storing said second sequence of second logic variable segments; and
 (c) means for dividing predetermined ones of said second logic variable segments by said period to obtain certain other ones of said waveform characteristic ratios.

* * * * *